United States Patent
Sowa et al.

(10) Patent No.: US 10,366,099 B1
(45) Date of Patent: Jul. 30, 2019

(54) READER FOR MULTI-USER CAX ENTITIES CREATED OUTSIDE OF DATABASE

(71) Applicant: United Technologies Corporation, Hartford, CT (US)

(72) Inventors: William A. Sowa, Simsbury, CT (US); Joshua Daniel Winn, Ellington, CT (US); Charles Gregory Jensen, Provo, UT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 381 days.

(21) Appl. No.: 14/617,990

(22) Filed: Feb. 10, 2015

Related U.S. Application Data (60) Provisional application No. 61/938,197, filed on Feb. 11, 2014.

(51) Int. Cl.
| | |
|---|---|
| *G06F 17/30* | (2006.01) |
| *G06F 16/25* | (2019.01) |
| *G06F 16/27* | (2019.01) |
| *G06F 16/955* | (2019.01) |
| *G06F 16/23* | (2019.01) |
| *G06F 17/50* | (2006.01) |

(Continued)

(52) U.S. Cl.
CPC ............ *G06F 16/258* (2019.01); *G06F 16/27* (2019.01); *G06F 16/955* (2019.01); *G06F 16/1794* (2019.01); *G06F 16/2308* (2019.01); *G06F 16/93* (2019.01); *G06F 17/50* (2013.01); *G06F 17/5018* (2013.01); *G06F 2217/04* (2013.01)

(58) Field of Classification Search
CPC ............... G06F 17/50; G06F 17/30005; G06F 17/30008; G06F 17/30011; G06F 16/2794; G06F 16/2308; G06F 16/93
USPC .................. 707/634, 756; 700/104, 105, 182
See application file for complete search history.

(56) References Cited

U.S. PATENT DOCUMENTS

| | | | |
|---|---|---|---|
| 7,069,192 B1 * | 6/2006 | Freitag .................... | G06F 17/50 700/182 |
| 8,229,715 B1 | 7/2012 | Teller et al. | |
| 8,566,066 B2 | 10/2013 | Thompson et al. | |

(Continued)

OTHER PUBLICATIONS

Xu, Yue. (2010). A Flexible Context Architecture for a Multi-User GUI. Department of Mechanical Engineering, Brigham Young University, Dec. 2010.

(Continued)

*Primary Examiner* — Dangelino N Gortayo
(74) *Attorney, Agent, or Firm* — Carlson, Gaskey & Olds, P.C.

(57) ABSTRACT

A system for collaborating on a component according to an exemplary aspect of the present disclosure includes, among other things, a first multi-user CAx environment including a data module and an import module. The data module is configured to access a database relating to a component design. The component design relates to a group of function-based commands. The import module is configured to cause an external data entity relating to at least one feature of the component design to be imported into the first multi-user CAx environment, and is configured to cause the data module to store data relating to the external data entity in the database. A method for collaborating on a component design is also disclosed.

21 Claims, 4 Drawing Sheets

(51) Int. Cl.
*G06F 16/178* (2019.01)
*G06F 16/93* (2019.01)

(56) References Cited

U.S. PATENT DOCUMENTS

| | | | | |
|---|---|---|---|---|
| 8,818,769 | B2* | 8/2014 | Trainer | G06F 17/50 |
| | | | | 703/1 |
| 8,890,867 | B2* | 11/2014 | Buchowski | G06T 19/20 |
| | | | | 345/420 |
| 8,892,404 | B2* | 11/2014 | Potter | G06F 17/50 |
| | | | | 703/1 |
| 9,122,817 | B2* | 9/2015 | Red | G06F 17/50 |
| 2001/0016803 | A1* | 8/2001 | Sartiono | G05B 19/4097 |
| | | | | 703/1 |
| 2010/0042676 | A1* | 2/2010 | Seroussi | G06F 17/5004 |
| | | | | 709/203 |
| 2011/0022613 | A1* | 1/2011 | Stolper | G06F 17/50 |
| | | | | 707/756 |
| 2013/0144566 | A1* | 6/2013 | De Biswas | G06T 17/005 |
| | | | | 703/1 |
| 2013/0239011 | A1* | 9/2013 | Red | G06T 5/00 |
| | | | | 715/743 |
| 2014/0149882 | A1* | 5/2014 | Nysetvold | H04L 65/403 |
| | | | | 715/751 |
| 2014/0188437 | A1* | 7/2014 | Red | G06F 17/5018 |
| | | | | 703/1 |
| 2014/0222386 | A1* | 8/2014 | Cannon | G06F 17/5018 |
| | | | | 703/1 |
| 2014/0222387 | A1 | 8/2014 | Cannon et al. | |
| 2014/0222919 | A1* | 8/2014 | Nysetvold | H04L 65/403 |
| | | | | 709/204 |
| 2014/0278269 | A1* | 9/2014 | Winn | G06F 17/50 |
| | | | | 703/1 |

OTHER PUBLICATIONS

Red, E., French, D., Hepworth, A., Jensen, G., Stone, B. (2014). Multi-User Computer-Aided Design and Engineering Software Applications. Cloud-Based Design and Manufacturing (CBDM), Springer International Publishing, Jan. 1, 2014, pp. 25-62.

Red, E., Jensen, G., Ryskamp, J., Mix, K. (2010). NXConnect: Multi-User CAx on a Commercial Engineering Software Application. Department of Mechanical Engineering, Brigham Young University.

* cited by examiner

READER FOR MULTI-USER CAX ENTITIES CREATED OUTSIDE OF DATABASE

CROSS-REFERENCE TO RELATED APPLICATIONS

This application claims the benefit of U.S. Provisional Application 61/938,197, filed Feb. 11, 2014.

BACKGROUND

This disclosure relates to computer-aided technologies (CAx), and more particularly, to the characterization of component designs in a computing environment.

CAx software is widely used across a number of industries and there are numerous providers of CAx software with substantially overlapping sets of features. CAx software is used to develop tools, parts, assemblies, structures and other components using a computer system during the design, analysis, and manufacturing phases, for example. CAx software may be used by a user or group of users to build, analyze, and manufacture complex elements. These CAx software applications are generally not compatible with one another and generally allow single users to manipulate the various designs. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a first multi-user CAx environment including a data module and an import module. The data module is configured to access a database relating to a component design. The component design relates to a group of function-based commands. The import module is configured to cause an external data entity relating to at least one feature of the component design to be imported into the first multi-user CAx environment, and is configured to cause the data module to store data relating to the external data entity in the database.

In a further embodiment of any of the foregoing embodiments, the external data entity relates to at least one user-defined function operable to characterize the component design.

A further embodiment of any of the foregoing embodiments includes an editing module configured to cause the data module to store data relating to at least one user-defined object to the database. The at least one user-defined object is generated in response to execution of the at least one user-defined function.

In a further embodiment of any of the foregoing embodiments, the at least one user-defined object is operable to define the at least one feature in response to setting at least one parameter of the at least one user-defined object.

In a further embodiment of any of the foregoing embodiments, the import module is configured to import data relating to the external data entity in response to accessing at least one application programming interface. The at least one application programming interface is operable to associate the data relating to the external data entity to the group of function-based commands. Each command of the group of function-based commands is operable to generate data relating to the at least one feature.

In a further embodiment of any of the foregoing embodiments, the first multi-user CAx environment is configured to execute a first function set in a single user mode and a second function set in a multi-user mode. The database is configured to store data relating to the external data entity in a format common to at least one of the first and second function sets. Each of the first and second function sets is operable to characterize the component design.

A further embodiment of any of the foregoing embodiments includes an export module configured to export data relating to the external data entity from the first multi-user CAx environment in a format common to at least one of the first function set and the second function set.

In a further embodiment of any of the foregoing embodiments, the external data entity relates to one or more attributes of the at least one feature, the one or more attributes being distinct from each command of the group of function-based commands.

In a further embodiment of any of the foregoing embodiments, the one or more attributes relates to at least one of an audio stream and a video stream.

A further embodiment of any of the foregoing embodiments includes a synchronization module configured to communicate data relating to the external data entity from the database to a second multi-user CAx environment configured to access the component design in the database.

A system for collaborating on a component according to an example of the present disclosure includes at least one database configured to store data relating to a component design in a memory storage device. The component design relates to a group of predetermined functions. A host server includes a processor configured to execute a host multi-user CAx environment. The host multi-user CAx environment has an import module and a synchronization module. The import module is configured to cause at least one external data entity to be imported into the at least one database. The at least one external data entity relates to at least one feature of the component design. The synchronization module is configured to communicate data relating to the at least one external data entity between the database and at least one client multi-user CAx environment configured to access the at least one database.

In a further embodiment of any of the foregoing embodiments, the at least one database is operable to link the at least one external data entity to the component design.

In a further embodiment of any of the foregoing embodiments, the client multi-user CAx environment is configured to cause data relating to the external data entity to be imported into the at least one database directly from the host multi-user CAx environment.

In a further embodiment of any of the foregoing embodiments, the at least one client multi-user CAx environment is configured to execute a first function set in a single user mode and a second function set in a multi-user mode. Each of the first and second function sets is operable to characterize the component design. The database is configured to store data relating to the at least one external data entity in a format common to at least one of the first and second function sets.

A further embodiment of any of the foregoing embodiments includes a part management module configured to translate the at least one external data entity between a first format common to the first function set and a second format common to the second function set.

In a further embodiment of any of the foregoing embodiments, the host multi-user CAx environment includes an export module configured to export data relating to the at least one external data entity from the at least one database in a format common to at least one of the first and second function sets.

A method for collaborating on a component according to an example of the present disclosure includes the steps of accessing a database relating to a group of function-based command and causing data relating to an external data entity to be imported into a first multi-user CAx environment and to be stored in the database. The external data entity relates to at least one feature of a component design, and the component design relates to the group of functions-based commands.

A further embodiment of any of the foregoing embodiments includes communicating data relating to the external data entity from the database to a second multi-user CAx environment configured to access the database.

In a further embodiment of any of the foregoing embodiments, the first multi-user CAx environment is configured to execute a first function set in a single user mode and a second function set in a multi-user mode. The database is configured to store data relating to the external data entity in a format common to at least one of the first function set and the second function set.

A further embodiment of any of the foregoing embodiments includes exporting data relating to the external data entity in a format common to at least one of the first and second function sets.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
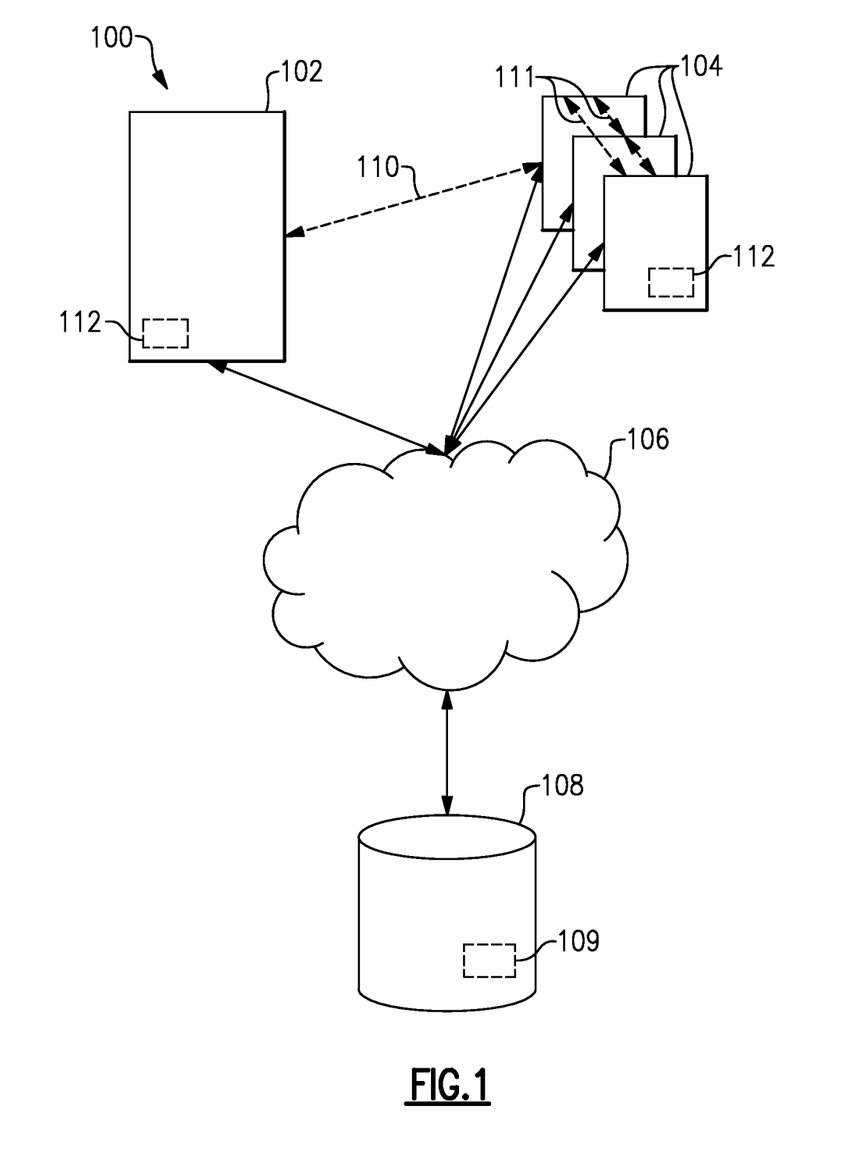
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for embodiment. Accordingly, it may be desirable to limit access to aspects of a component design depending on the level(s) of access provided to a particular user profile. In some embodiments, each user profile corresponds to one or more access lists setting the level(s) of access for each user profile.

Figure 2A:
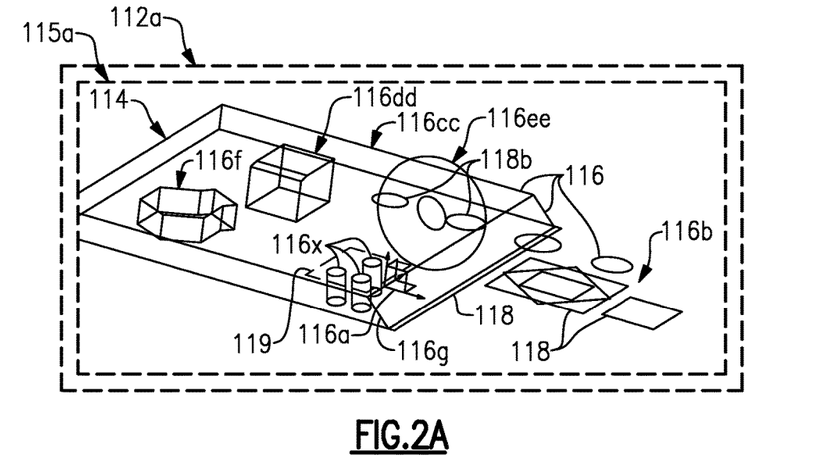
FIG. 2A illustrates a sample component design displayed in a first CAx environment, according to an embodiment.
Figure 2B:
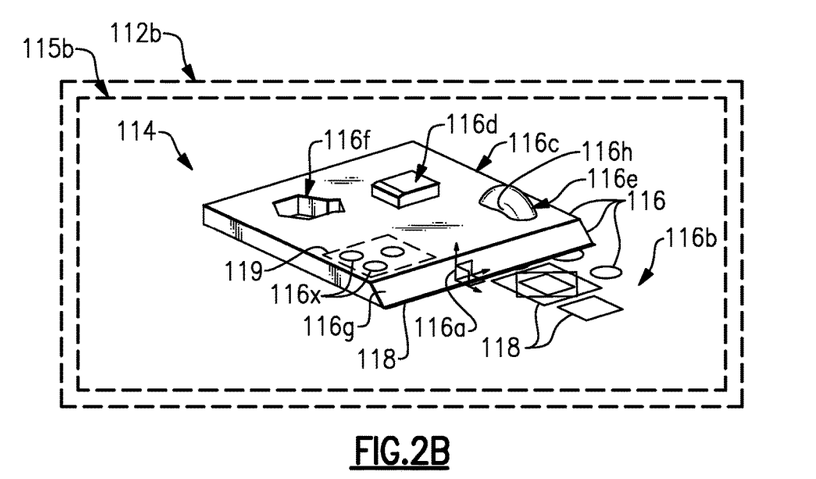
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112*b*, shown in FIGS. 2A-2B respectively. Each of the CAx environments 112*a*, 112*b* is associated with a different one of the client computers 104, for example.

The sample component design 114 includes one or more features 116 each corresponding to a feature type. The features 116 shown in FIG. 2A include a datum coordinate system 116*a*, and a sketch 116*b* having one or more sketch entities or geometries 118 illustrated as ellipses and rectangles, for example. Some features 116 shown in FIG. 2B include solids such as extrudes 116*c*, 116*d*, which are applied to geometries 118 of the sketch 116*b* and are characterized by wireframes 116*cc*, 116*dd* shown in FIG. 2A. Other example features include a hole or Boolean 116*f* forming an opening in the extrude 116*c*, and a chamfer 116*g* applied to extrude 116*c*. Non-geometric features include surface shading 116*h* (shown in FIG. 2B) applied to the rotate 116*e* feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112*a*, 112*b*. As illustrated by the CAx environment 112*a* in FIG. 2A, the user has selected one or more visualization settings to show the wireframe geometries 116*cc*, 116*dd*, 116*ee* and to hide the corresponding solid features 116*c*, 116*d*, 116*e*. In the CAx environment 112*b* shown in FIG. 2B, the user has selected one or more visualization settings to show solid features 116*c*, 116*d*, 116*e* and to hide wireframes 116*c*, 116*d*, 116*f*, for example. The visualization settings of each CAx environment 112 can be customized according to the needs of a particular situation even though each of the users is working on the same component design 114.

In some embodiments, a multi-user CAx environment, such as one of the CAx environments 112*a*, 112*b* of FIGS. 2A-2B, includes or is otherwise provided with a multi-user command set operable to permit the CAx environment 112 to collaborate on a component design 114 with one or more other CAx environments 112 in a multi-user CAx system such as CAx system 100. The multi-user CAx environment 112 may also include, or is otherwise provided with, a native or local command set operable to edit, create or otherwise characterize various aspects of a component design 114. The multi-user CAx command set is mapped to at least some of the local CAx command set such that the user is able to cause one or more commands in the local CAx command set to execute to generate one or more features 116 of a component design 114 while in a multi-user mode.

A user provided with a CAx environment 112 may desire to characterize various aspects of a component design 114 in a manner not otherwise provided or previously defined in the CAx environment 112. The user may therefore import one or more external data entities at various locations in the multi-user CAx system 100 to characterize various aspects of a component design 114, thus achieving a new state. The user may also desire to store the external data entities in the database 109 and/or share the external data entities 105 (shown in FIG. 3) with one or more other CAx environments 112. The term "external data entity" refers to data relating to a component design or at least one feature of a component design, including data that is utilized to generate or edit some aspect of a component design, data that is a result of its operation, or is utilized to inform the user about a component design or a particular feature.

Figure 3:
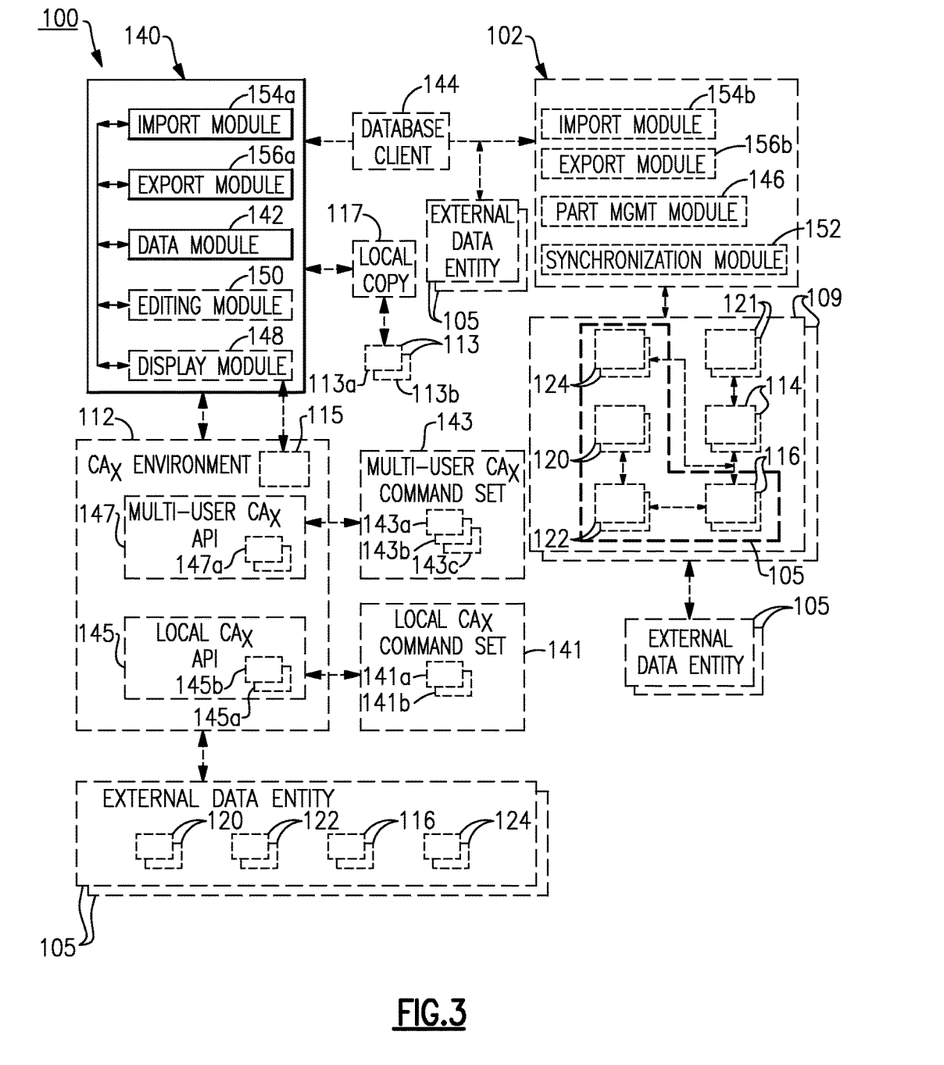
FIG. 3 illustrates a system for characterizing a component design with external data entities, according to an embodiment.

In some embodiments, the external data entity may be one or more user defined functions (UDFs) 120 operable to characterize various aspects of a component design, which may be operable to generate one or more corresponding user defined objects (UDOs) 122 (shown in FIG. 3). The term "user defined function" (UDF) refers to one or more commands or operations that are defined, created or designated by a user or CAx environment that do not have corresponding predefined function calls in a multi-user CAx application programming interface (API), tool, library or instruction set provided to a multi-user CAx environment. The term "user defined object" (UDO) refers to a result of one or more UDFs and may be characterized by one or more parameters or attributes. Utilizing the techniques discussed below, one or more users provided with a multi-user CAx environment can characterize various aspects of a component design in an efficient manner by reusing or sharing external data entities 105 such as UDFs 120 and/or UDOs 122.

In other embodiments, the external data entity 105 includes or otherwise relates to various secondary information or attributes 124 (shown in FIG. 3) relevant to a component design 114 or one or more features 116. In one embodiment, the attributes are distinct from each command in the group of predefined commands or feature-based functions in the multi-user CAx command set or API 143, 147 (shown in FIG. 3). In another embodiment, the attributes are distinct from the local or native CAx command set or API 141, 145 (shown in FIG. 3). The external data entity 105 may inform the user about various aspects of a component design, even though the data is not used to create, edit or display the component design 114.

In some embodiments, the secondary information or attributes 124 include one or more chat sessions, audio streams and/or video streams, or any combination thereof, recorded or otherwise captured during a collaborative session between two or more users provided with a CAx environment 112. In some embodiments, the secondary information may relate to the various disciplines involved in the collaboration of a component design, including management, engineering, logistical and production artifacts or data, such a bill of material (BOM) relating to one or more component designs 114 and/or feature 116. In another embodiment, the secondary information 124 includes one or more informal drawings or sketches created outside of the multi-user CAx system 100, which may be utilized to communicate a particular design intent. In this manner, the secondary information 124 can be associated with the component design 114, and accessed or shared between the various stakeholders in an efficient manner.

FIG. 3 illustrates a CAx package 140 for characterizing a component design 114 with one or more external data entities 105, such as the external data entities between CAx environments 112a, 112b shown in FIGS. 2A-2B, according to an embodiment. FIG. 3 illustrates reading and writing external data entities 105 and feeding them into a multi-user CAx system 100 in the form of attributes, expressions, geometry, or other CAx features that can be understood and processed by the CAx package 140. The implementation supports various forms of external data entities 105, including features 116 corresponding to one or more predefined commands or feature-based functions, UDFs 120, UDOs 122, related user defined features 116 and/or one or more attributes or secondary information 124, including any of the external data entities discussed herein. The CAx package 140 is configured to communicate various data between one or more CAx environments 112 such that each of the CAx environments 112 is able to create, edit, display and/or otherwise interact with the one or more external data entities 105. External data entities 105 may be imported from, or exported to, various external data locations, such as a local computer or network. In alternate embodiments, other locations may be utilized.

In some embodiments, the CAx package 140 is provided as a portion of a CAx software tool integrated into, or integrated with, a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more component designs 114. Each of these modules includes executable software instructions and/or digital or analog hardware circuitry.

The CAx package 140 includes a data module 142 configured to access, retrieve and/or store data corresponding to one or more component designs 114. In one embodiment, the data module 142 is configured to interface with, or otherwise interact with, a database client 144 to access one or more databases 109. In another embodiment, the data module 142 and/or database client 144 is configured to interface with various middle tier services, such as authentication service(s), to store, retrieve or otherwise access data corresponding to a component design 114 in one or more databases 109.

In some embodiments, the data is stored in the database 109 as one or more tables, records or entries. In other embodiments, the data is stored in one or more part files 113 and is accessible by referencing one or more objects or memory locations referenced by the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, and a list 121 of feature types or function-based commands corresponding to the features 116, for example.

In one embodiment, the data module 142 is configured to create a local copy 117 of the data, which is updated or synchronized with modifications to various aspects of the component design 114 periodically or in real-time utilizing various techniques. In some embodiments, the local copy 117 includes one or more part files 113. In some embodiments, the local copy 117 includes separate part files 113, such as part files 113a, 113b, in different data formats. In one embodiment, the data module 142 is configured to cache data such that accessing the database 109 does not cause data corresponding to additions or changes to the component design(s) 114 and/or corresponding feature(s) 116 in the local copy 117 to update unless at least one predefined condition is met, such as the utilization of a checkpoint or timestamp set for the corresponding component design(s) 114, for example. In some embodiments, the data module 142 is configured to reload the local copy 117 with data from the database 109 when the at least one predefined condition is met.

In some embodiments, the CAx package 140 includes a display module 148. The display module 148 is configured to display data corresponding to one or more component designs 114 and/or features 116 within a viewing frustum 115, such as in one of the viewing frustums 115a, 115b shown in FIGS. 2A-2B. In one embodiment, the display module 148 is configured to display data according to the local copy 117. The display module 148 may be configured to selectively display one or more graphical user interfaces (GUIs) operable to perform various CAx functions provided by the CAx environment 112 and related CAx tools, including the creation, editing or deletion of various aspects of a component design 114. The GUIs may be organized according to the needs of a particular situation in accordance with the teachings of this disclosure.

In some embodiments, the CAx package 140 includes an editing module 150 configured to generate or edit data corresponding to the component design 114. In some embodiments, the editing module 150 selectively causes the data module 142 to communicate data corresponding to the component design 114 between the CAx environment 112 and the database 109 such that the user is able to view, create or edit various aspects of the component design 114 within the CAx environment 112. In one embodiment, the editing module 150 is configured to selectively cause the data module 142 to store the data to and from the local copy 117.

The editing module 150 is configured to interface with various aspects or functionality of the CAx environment 112 to characterize a component design 114. In some embodiments, the CAx environment 112 is based upon, or is integrated or interfaces with, a CAx software tool such as CATIA, Autodesk®, Solidworks®, Autocad®, or the like. Existing CAx software tools, such as those listed previously, include one or more proprietary, native or local commands or instructions in a native or local CAx command set 141. The native commands are operable to generate, create or edit one or more features 116 of a component design 114 locally in the CAx environment 112.

The CAx environment 112 includes, integrates, interfaces with, or is otherwise provided with, one or more global commands in a multi-user CAx command set 143 to collaborate with other CAx environments 112 in a multi-user system. In one embodiment, the multi-user CAx command set 143 is mapped to the local CAx command set 141 such that calls to one or more global commands causes one or more corresponding native commands to execute in the CAx environment 112, or vice versa. In an embodiment, the CAx environment 112 interfaces with the local CAx command set 141 via a local CAx application programming interface (API) 145 and interfaces with the multi-user CAx command set 143 via a multi-user CAx API 147, although other arrangements are contemplated. Each command set 141, 143 and/or API 145, 147 can be programmed in the CAx software directly, provided as one or more software libraries, executables or plug-ins adapted to work with the native CAx software or tool, or provided in a standalone program to interface with the CAx environment 112 to provide the desired solution.

In some embodiments, the CAx environment 112 is configured to execute in at least a multi-user mode and a single-user mode. In the multi-user mode, the editing module 150 is configured to cause at least one command in the multi-user CAx command set 143 to execute to characterize a component design 114, which may cause one or more native or local commands to execute. In the single-user mode, the editing module 150 is configured to cause at least one native or local command in the local CAx command set 141 to execute, thereby creating, editing or otherwise characterizing one or more aspects of a component design 114. In some embodiments, data generated by execution of the local commands is not compatible with the arrangement of the database 109, the multi-user CAx command set 143 and/or the multi-user CAx API 147. In this manner, data generated by execution of the local commands is not synchronized between each CAx environment 112 accessing the component design in the database 109.

The CAx package 140 includes an import module 154 configured to import one or more external data entities 105 into the multi-user CAx system 100 such as in the CAx environment 112 or database 109. In some embodiments, the CAx package 140 includes an export module 156 configured to export one or more external data entities 105 from the CAx environment 112 or database 109. The import module 154 and export module 156 can be programmed at various locations in the multi-user CAx system 100.

In one embodiment, a client based external data reader/writer technique is used, including one or more client computers 104 executing an import module 154a and an export module 156a in a client multi-user CAx environment 112. The import module 154 is configured to import or read in the external data entity 105 using the multi-user CAx API 147, for example. The data is converted into information that can be inserted into the database 109. This allows multiple users to utilize the data in a distributed fashion using the multi-user CAx API 147. Similarly, if the information inside of the database 109 needs to be extracted, the multi-user CAx API 147 is configured to access or pull the data from storage and send it to the export module 156 which puts the data into a format suitable for external manipulation or analysis.

In another embodiment, the import module 154 and export module 156 are configured to execute, or directly interface, at a server level on the host computer 102 executing an import module 154b and an export module 156b in a host multi-user CAx environment. The import module 154 and export module 156 interface with the database 109 (e.g., using SQL or other database language) using a user interface, command line, or stored procedure which can take the external data entity 105 and insert it directly into the database 109. The multi-user CAx environment 112, utilizing the aforementioned database 109, would then be able to display or insert this database data into a readable or displayable format.

The user is able to interact with the CAx environment 112 to cause one or more commands 147a in the multi-user CAx API 147 to import, export, generate, create or load one or more external data entities 105, such as one or more UDFs 120, UDOs 122 or attributes 124. In some embodiments, the multi-user CAx API 147 includes various commands to characterize UDOs 122, such as setting or otherwise indicating various parameters including geometry, location, orientation, etc., to create or define corresponding user defined feature 116. The multi-user CAx API 147 is configured to import and/or export the external data entities 105 into the database 109 and/or the CAx environment 112.

Various UDFs 120 and UDOs 122 are contemplated. In some embodiments, the user interacts with the CAx environment 112 to cause one or more commands 147a in the multi-user CAx API 147 to group or otherwise designate two or more global commands 143a, 143b in a multi-user CAx command set 143 to be a UDF 120. In one illustrative embodiment, the UDF is operable to generate cooling holes or passages in an airfoil of a gas turbine engine based on one or more user defined parameters for location, shape, etc. The parameters are related to one or more sketch, extrusion and Boolean feature types, for example. In another illustrative embodiment, the UDF 120 is operable to generate a set of passages 116x (shown in FIGS. 2A-2B) based upon input parameters such as designating a surface area 119 and a desired quantity of passages, for example. In this manner, the UDF 120 corresponds to a group of predetermined feature types or commands in the multi-user CAx command set 143 or API 147, but aggregates two or more of the commands to simplify their execution.

In another embodiment, the user interacts with the CAx environment 112 to cause one or more commands in the multi-user CAx API 147 to group or otherwise designate two or more local commands 141a, 141b in a local CAx command set 141 or two or more commands such as 145a, 145b in the local CAx API 145 to be a UDF 120. The functionality of the UDF 120 may then be executed by interacting with the multi-user CAx API 147 in a simplified and efficient manner.

In some embodiments, the local command set 141, API 145 or another portion of the CAx environment 112 is modified or otherwise updated to include or access one or more software instructions or algorithms corresponding to one or more UDFs 120. The additional capability may relate to functions not previously available to the CAx environment 112, such as a unique sweep feature, for example. In one embodiment, the additional capability corresponds to a density model or algorithm operable to calculate a density of a particular base feature 116. In one embodiment, the user defined model or algorithm is operable to generate output, which may be provided to an output file or window or graphic in the viewing frustum 115, for example, based upon one or more parameters supported by the local or multi-user CAx command sets 141, 143.

The editing module 150 is configured to cause the data module 142 to store data corresponding to one or more external data entities 105 to the database 109. Various techniques for storing the data are contemplated, including various data formats, based on the needs of a particular situation. In some embodiments, the external data entities 105 are stored into the database 109 in a database format, which may be a global format common with the multi-user CAx command set 143 and/or API 147. The information may be stored so that the information can be accessed and used at a later point in time. A table element containing the external data entity 105 information may be created within the model database 109 to hold the data for future use.

In some embodiments, the data module 142 is configured to store data corresponding to the external data entities 105, such as UDFs 120, UDOs and/or related user defined features 116, in a native data format common with the local CAx command set 141 and/or API 145. In this arrangement, each CAx environment 112 provided with the local CAx command set 141 and/or API 145 is able to generate, edit or load the external data entities 105, even if other CAx environments 112 in the multi-user system 100 are unable to do so. In some embodiments, the external data entity 105 is distinct from the local CAx command set and API 141, 145 and multi-user CAx command set and API 143, 147. For example, the attribute 124 may be stored as one or more audio or video files, which are distinct from the command sets 141, 143 and APIs 145, 147.

In another embodiment, the database 109 is configured to store data corresponding to one or more external data entities 105, such as one or more UDOs 122 or user defined features 116, in a raw, neutral or unwrapped format, which may be stored in the database 109 and/or a part file 113 linked to the database 109 as coordinate data corresponding to geometry of the particular UDO 122 or user defined feature 116. In another embodiment, the data is stored in the database 109 as different record entries and/or part files 113 corresponding to the global and native data formats. This allows a CAx specific wrapper applied by the multi-user CAx API 147, for example, to incorporate the geometry or entities of the UDO 122 or related features 116 into a model in a format that the local or native CAx command set 141 or API 145 recognizes. The UDO 122 or related features 116, when wrapped, may also utilize the parametric definitions provided by the designer and that are available in the local CAx command set 141 or API 145.

In some embodiments, the data module 142 is configured to interface or otherwise interact with a part management service module 146. The part management service module 146 is operable to translate data corresponding to one or more external data entities 105 between two different formats, such as native and global formats, or between two different native formats relating to two different CAx tools, for example.

Rather than embedding the external data entity architecture at the local application level, each external data entity 105 may be stored into the database 109 directly. The technique of storing the entity into the database 109 directly enables a reader/writer capability to manipulate the external data entity 105 at a more abstracted database level using a database query language. The external data entity 105 may also be generated by storing script files within the database 109 that can be called in the CAx environment 112 to auto generate the external data entity 105, or a result of its operation, such as a corresponding UDO 122 or feature 116.

Various techniques for communicating data relating to the external data entities 105 are contemplated. In some embodiments, the multi-user CAx command set 143 includes one or more interoperability commands 143c, which are mapped to or associated with the multi-user CAx API 147, and are operable to store the external data entity 105 or data generated by the local commands to the database 109.

In other embodiments, compression and decompression logic is programmed in the multi-user CAx command set 143 or API 147, data module 142, database client 144, and/or host server 102 or database 109, for example, to communicate data relating to external data entities 105 between the CAx environment 112 and the database 109. Additional feature based compression and decompression logic may be created, when an external data entity 105 such as a UDF 120 and/or UDO 122 is created, imported or exported, using a programming language accessible to the user that utilizes existing network communication protocols. In one embodiment, each external data entity such as a UDF 120 or UDO 122 will have its own unique compression and decompression code. That is, the external data entity 105 would require creation of unique compression and decompression logic. Various communications protocols are contemplated, such as User Datagram Protocol (UDP), Transmission Control Protocol/Internet Protocol (TCP/IP), or other network communication protocols (JSON, XML, SOAP, etc.), for example. The external data entity 105 is then restored to its original definition by decompressing the transmitted data.

In some embodiments, the data module 142 is configured to selectively reload the local copy 117 in response to another CAx environment 112 storing data corresponding to an external data entity 105 to the database 109, or by otherwise receiving external data entities 105 or related data directly or indirectly from another CAx environment 112.

In some embodiments, the data module 142 and/or database client 144 interfaces or otherwise communicates with a synchronization module 152 configured to communicate data relating to one or more external data entities 105 from the database 109 to one or more CAx environments 112 accessing the component design 114. In another embodiment, the synchronization module 152 is configured to cause the external data entity 105 to replicate on each client CAx environment 112 connected to the multi-user CAx system 100 or database 109.

In one embodiment, the synchronization module 152 is configured to cause a portion of the multi-user CAx command set 143 or API 147 to update in response to data relating to one or more external data entities 105, such as UDFs 120 or UDOs 122, being stored in the database 109. The synchronization module 152 may cause a list 121 of function types or function-based commands to update, thereby indicating to the user that a particular external data entity 105 is available in the CAx environment 112. In this manner, the user is able to interact with the CAx environment 112 to access the external data entity 105, such as causing one or more UDFs 120 to execute to generate new UDOs 122 or user defined features 116 in the CAx environment 112, or by displaying the external data entity 105, for example.

Figure 4:
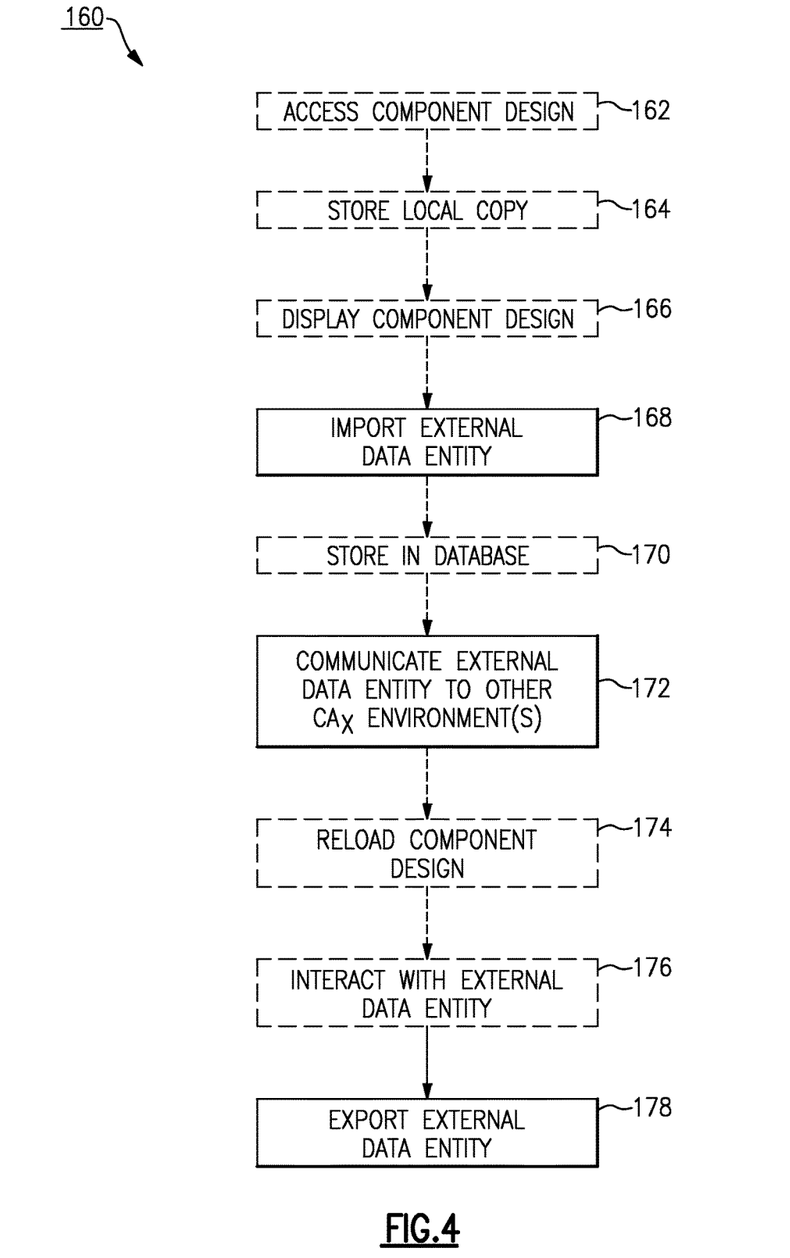
FIG. 4 illustrates a process for characterizing a component design with external data entities, according to an embodiment.

FIG. 4 illustrates a flowchart as an algorithm 160 for importing and exporting external data entities, utilizing any of the techniques described in this disclosure and the CAx package 140 shown in FIG. 3 according to the process flow of FIG. 4, according to an embodiment. In some embodiments, the algorithm 160 is executed at least in part within a multi-user CAx environment, such as one of the CAx environments 112a, 112b shown in FIGS. 2A-2B, or a CAx host computer and/or server 102.

In some embodiments, a CAx environment accesses data corresponding to a component design from at least one database at block 162, and stores a local copy of the data in the CAx environment at block 164. The CAx environment may display data corresponding to the component design according to the local copy, for example, at block 166.

One or more external data entities are imported into a multi-user CAx system, such as into a client multi-user CAx environment and/or directly into the database by a host multi-user CAx environment, at block 168. The external data entities can include any of the external data entities described herein, for example. In some embodiments, data corresponding to the external data entity is stored in the database at block 170. The data may be communicated to the database utilizing any of the techniques described herein, including various compression and decompression techniques and various communications protocols. The external data entity 105 may also be used for UDF or UDO information. As such, if UDF or UDO information is not programmed into the multi-user CAx system or API, additional steps must be taken to implement the work flow utilizing any of the techniques described herein.

Data corresponding to the external data entity may be stored in the database in a common format or a native format common to the client CAx environment, for example. Data corresponding to the external data entities is communicated from the database, or directly from the CAx environment, to another CAx environment at block 172, utilizing any of the techniques of this disclosure, including various compression and decompression techniques and various communications protocols. In some embodiments, the data is replicated to each CAx environment accessing the database or otherwise collaborating on the component design.

In some embodiments, at block 174 one or more CAx environments collaborating on the component design, or accessing the database, reload the component design in response to receiving data relating to the external data entity. In other embodiments, the user provided with the CAx environment is able to view, edit or otherwise interact with the external data entity, or a result of its operation, at block 176. In some embodiments, the external data entity is exported from the client CAx environment, a host CAx environment, the database, or another device connected to the database at block 178, utilizing any of the techniques of this disclosure.

The algorithm 160 can programmed in the CAx software directly, provided as one or more software plug-ins adapted to work with the native CAx software, or provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running a multi-user CAx environment 112 can be programmed with multiple additional tools, and the various features and tools included can be configured to interoperate with each other according to known principles. The specific external data entity, UDF or UDO functionality may be programmed at each location shown in FIG. 3 to support the importation, exportation and/or creation of the external data entities, UDFs and UDOs, transmission of the external data entity, UDF or UDO data across the network, and storage of the external data entity, UDF and UDO data in the database 109.

Although the above embodiments illustrate a specific component, embodiments of this disclosure are not limited to those particular combinations. One skilled in the art having the benefit of this disclosure will recognize that it is possible to use some of the components or features from one of the examples in combination with features or components from another one of the examples. Furthermore, various embodiments may include one or more examples within them, while other embodiments may include a different subset of examples. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
   a computing device configured to execute a first multi-user computer-aided technologies (CAx) environment including a data module and an import module;
   wherein the data module is configured to access a database relating to a component design, the component design relating to a group of function-based commands;
   wherein the import module is configured to cause an external data entity relating to at least one feature of the component design to be imported into the first multi-user computer-aided technologies (CAx) environment, and is configured to cause the data module to store data relating to the external data entity in the database;
   wherein the database is configured to store data relating to the component design in a first format common with a first function set, and in a second format common with a second function set, the second function set being a multi-user computer-aided technologies (CAx) command set, and each of the first and second function sets being operable to characterize the component design; and
   wherein the database stores data relating to the external data entity in in the first format, but not the second format, in response to receiving the data relating to the external data entity.

2. The system as recited in claim 1, wherein the external data entity relates to at least one user-defined function operable to characterize the component design.

3. The system as recited in claim 2, further comprising an editing module configured to cause the data module to store data relating to at least one user-defined object to the database, and wherein the at least one user-defined object is generated in response to execution of the at least one user-defined function.

4. The system as recited in claim 3, wherein the at least one user-defined object is operable to define the at least one feature in response to setting at least one parameter of the at least one user-defined object.

5. The system as recited in claim 2, wherein the import module is configured to import data relating to the external data entity in response to accessing at least one application programming interface, the at least one application programming interface being operable to associate the data relating to the external data entity to the group of function-based commands, and wherein each command of the group of function-based commands is operable to generate data relating to the at least one feature.

6. The system as recited in claim 3, wherein the at least one user-defined function is distinct from the multi-user computer-aided technologies (CAx) command set.

7. The system as recited in claim 1, wherein:
   the first multi-user computer-aided technologies (CAx) environment is configured to execute the first function set in a single user mode and the second function set in a multi-user mode.

8. The system as recited in claim 7, further comprising an export module configured to export data relating to the external data entity from the first multi-user computer-aided technologies (CAx) environment in the first format or the second format.

9. The system as recited in claim 1, wherein the external data entity relates to one or more attributes of the at least one feature, the one or more attributes being distinct from each command of the group of function-based commands.

10. The system as recited in claim 9, wherein the one or more attributes relates to at least one of an audio stream and a video stream.

11. The system as recited in claim 1, further comprising a synchronization module configured to communicate data relating to the external data entity from the database to a second multi-user computer-aided technologies (CAx) environment configured to access the component design in the database.

12. A system for collaborating on a component, comprising:
   at least one database configured to store data relating to a component design in a memory storage device, the component design relating to a group of predetermined functions;
   a host server including a processor configured to execute a host multi-user computer-aided technologies (CAx) environment, the host multi-user computer-aided technologies (CAx) environment having an import module and a synchronization module;
   wherein the import module is configured to cause at least one external data entity to be imported into the at least one database, the at least one external data entity relating to at least one feature of the component design;
   wherein the synchronization module is configured to communicate data relating to the at least one external data entity between the database and at least one client multi-user computer-aided technologies (CAx) environment configured to access the at least one database;
   wherein the at least one database is configured to store data relating to the component design in a first format common with a first function set, and in a second format common with a second function set, the second function set being a multi-user computer-aided technologies (CAx) command set, and each of the first and second function sets being operable to characterize the component design; and
   wherein the database stores data relating to the external data entity in in the first format, but not the second format, in response to receiving the data relating to the external data entity.

13. The system as recited in claim 12, wherein the at least one database is operable to link the at least one external data entity to the component design.

14. The system as recited in claim 12, wherein the client multi-user computer-aided technologies (CAx) environment is configured to cause data relating to the external data entity to be imported into the at least one database directly from the host multi-user computer-aided technologies (CAx) environment.

15. The system as recited in claim 12, wherein:
   the at least one client multi-user computer-aided technologies (CAx) environment is configured to execute the first function set in a single user mode and the second function set in a multi-user mode.

16. The system as recited in claim 15, further comprising a part management module configured to translate the at least one external data entity between the first format and the second format.

17. The system as recited in claim 15, wherein the host multi-user computer-aided technologies (CAx) environment includes an export module configured to export data relating to the at least one external data entity from the at least one database in the first format or the second format.

18. A method for collaborating on a component, comprising the steps of:
   accessing a database relating to a group of function-based commands;
   causing data relating to an external data entity to be imported into a first multi-user computer-aided technologies (CAx) environment and to be stored in the database;
   wherein the external data entity relates to at least one feature of a component design, and the component design relates to the group of functions-based commands;
   wherein the database is configured to store data relating to the component design in a first format common with a first function set, and in a second format common with a second function set, the second function set being a multi-user computer-aided technologies (CAx) command set, and each of the first and second function sets being operable to characterize the component design; and
   wherein the database stores data relating to the external data entity in in the first format, but not the second format, in response to receiving the data relating to the external data entity.

19. The method as recited in claim 18, further comprising communicating data relating to the external data entity from the database to a second multi-user computer-aided technologies (CAx) environment configured to access the database.

20. The method as recited in claim 18, wherein:
   the first multi-user computer-aided technologies (CAx) environment is configured to execute the first function set in a single user mode and the second function set in a multi-user mode.

21. The method as recited in claim 20, further comprising exporting data relating to the external data entity in the first format or the second format.

* * * * *